United States Patent
Karczewicz et al.

(10) Patent No.: US 10,778,974 B2
(45) Date of Patent: Sep. 15, 2020

(54) ADAPTIVE LOOP FILTER WITH ENHANCED CLASSIFICATION METHODS

(71) Applicant: QUALCOMM Incorporated, San Diego, CA (US)

(72) Inventors: Marta Karczewicz, San Diego, CA (US); Li Zhang, San Diego, CA (US); Wei-Jung Chien, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/025,772

(22) Filed: Jul. 2, 2018

(65) Prior Publication Data

US 2019/0014315 A1    Jan. 10, 2019

Related U.S. Application Data

(60) Provisional application No. 62/528,915, filed on Jul. 5, 2017.

(51) Int. Cl.
| | |
|---|---|
| *H04N 19/117* | (2014.01) |
| *H04N 19/82* | (2014.01) |
| *H04N 19/159* | (2014.01) |
| *H04N 19/176* | (2014.01) |
| *H04N 19/124* | (2014.01) |
| *H04N 19/14* | (2014.01) |

(Continued)

(52) U.S. Cl.
CPC ......... *H04N 19/117* (2014.11); *H04N 19/124* (2014.11); *H04N 19/14* (2014.11); *H04N 19/159* (2014.11); *H04N 19/176* (2014.11); *H04N 19/463* (2014.11); *H04N 19/82* (2014.11); *H04N 19/86* (2014.11)

(58) Field of Classification Search
CPC ......... H04N 19/80; H04N 19/85; H04N 19/98
USPC ........................................ 375/240.25, 240.29
See application file for complete search history.

(56) References Cited

U.S. PATENT DOCUMENTS

| | | |
|---|---|---|
| 2011/0069752 A1 | 3/2011 | Watanabe et al. |
| 2011/0274158 A1 | 11/2011 | Fu et al. |
| 2013/0022281 A1 | 1/2013 | Sato |

(Continued)

FOREIGN PATENT DOCUMENTS

| | | |
|---|---|---|
| EP | 2048886 A1 | 4/2009 |
| EP | 2584781 A1 | 4/2013 |

OTHER PUBLICATIONS

Algorithm Description of Joint Exploration Test Model 1 (JEM1), 113. MPEG Meeting, Oct. 19, 2015-Oct. 23, 2015, Geneva, CH (Motion Picture Expert Group or ISO/IEC JTC1/SC29/WG11), No. N15790, Dec. 11, 2015 (Dec. 11, 2015), XP030022473, 27 pp.

(Continued)

*Primary Examiner* — Dominic D Saltarelli
(74) *Attorney, Agent, or Firm* — Shumaker & Sieffert, P.A.

(57) ABSTRACT

An apparatus configured to decode video data, including a memory configured to store a block of a current picture of the video data, and one or more processors in communication with the memory. The one or more processors may be configured to reconstruct the block of the current picture of the video data, determine a classification, from among a plurality of classifications, of the block according to a rule, wherein the rule is adaptively determined based on characteristics of coded sequences of the video data, and apply an adaptive loop filter (ALF) to the block based on the classification of the block.

30 Claims, 9 Drawing Sheets

(51) Int. Cl.
H04N 19/463 (2014.01)
H04N 19/86 (2014.01)

(56) References Cited

U.S. PATENT DOCUMENTS

2017/0237981 A1   8/2017  Karczewicz et al.
2017/0237982 A1   8/2017  Karczewicz et al.
2017/0238020 A1   8/2017  Karczewicz et al.
2019/0110076 A1*  4/2019  Lim ..................... H04N 19/159

OTHER PUBLICATIONS

Alshina E., et al., "Known tools performance investigation for next generation video coding," 52nd Meeting, Jun. 19 through 26, 2015, Warsaw, Poland; ITU-Telecommunications Standardization Sector, Study Group 16 Question 6, Video Coding Experts Group (VCEG), VCEG-AZO5_r1, Jun. 25, 2015, 5 pp.
Alshina E., et al., "Description of Exploration Experiments on Coding Tools," Joint Video Exploration Team (JVET) of ITU-T SG 16 WP 3 and ISO/IEC JTC 1/SC 29/WG 11, 2nd Meeting: San Diego, USA, Document: JVET-B1011-v2, Feb. 20-26, 2016, pp. 1-5.
An J., et al., "Block partitioning structure for next generation video coding," MPEG doc. m37524 and ITU-T SG16 Doc.COM16-C966-E, Oct. 2015, pp. 1-7.
Bossen F., et al., "HM Software Manual," Joint Collaborative Team on Video Coding (JCT-VC) of ITU-T SG16 WP3 and ISO/IEC JTC1/SC29/WG11, Document: JCTVC-Software Manual, Retrieved on Jun. 18, 2015, pp. 1-27.
Bossen F., "Common test conditions and software reference configurations," Joint Collaborative Team on Video Coding (JCT-VC) of ITU-T SG16 WP3 and ISO/IEC JTC1/SC29/WG11, 12th Meeting: Geneva, CH, Jan. 14-23, 2013, JCTVC-L1100, 4 pp.
Chien W.G., et al., VCEG-AZ10-Extension of Advanced Temporal Motion Vector Predictor (ATMVP), 52nd Meeting, Jun. 19 through 26, 2015, Warsaw, Poland; ITU-Telecommunications Standarization Sector Study Group 16 Question 6 Video Coding Experts Group (VCEG), VCEG-AZ10 powerpoint, Jun. 25, 2015, 8 pp.
Chen et al., "Algorithm Description of Joint Exploration Test Model 6 (JEM 6)," Joint Video Exploration Team, F1001-v2, Mar. 31-Apr. 7, 2017, 48 pp.
Chen J., et al., "Coding tools investigation for next generation video coding," C 806, ITU-T Draft, Study Period 2013-2016, International Telecommunication Union, Geneva, CH, vol. 6/16, Jan. 27, 2015 (Jan. 27, 2015), XP044083237, pp. 1-7. [Retrieved on Jan. 27, 2015].
Chen J., et aL, "Further improvements to HMKTA-1.0," 52. VCEG meeting, Jun. 19, 2015-Jun. 26, 2015, Warsaw, PL (Video Coding Experts Group of ITU-T SG.16), No. VCEG-AZ07_v2, Jun. 19, 2015 (Jun. 19, 2015), XP030003885, the whole document, 9 pp.
Chen X., et al., "EE3: Decoder-Side Motion Vector Refinement Based on Bilateral Template Matching," Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-E0052, pp. 1-4.
Choi K., et al., "Information on coding efficiency improvements over HEVC for 4K content," Samsung Electronics, International Organisation for Standardisation Organisation Internationale De Normalisation ISO/IEC JTC1/SC29/WG11 Coding of Moving Pictures and Audio, ISO/IEC JTC1/SC29/WG11 MPEG2015/M37043, Geneva, Switzerland, Oct. 2015, 10 pp.
Galpin F., et al., "EE7 Adaptive Clipping in JEM3.0," Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0033-r2, pp. 1-10.
Huawei Technology Ltd. Co., "Reference sample adaptive filtering for intra coding," ITU, Telecommunication Standardization Sector, COM 16-C 983-E, Oct. 2015, 4 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
"ITU-T H.265, Series H: Audiovisual and Multimedia Systems, Infrastructure of audiovisual services—Coding of moving video, High efficiency video coding," The International Telecommunication Union, Apr. 2015, 634 pp.
Karczewicz M., et al., "EE2.5: Improvements on adaptive loop filter," Joint Video Exploration Team (JVET) of ITU-T SG 16 WP 3 and ISO/IEC JTC 1/SC 29/WG 11, Document: JVET-00038, 3rd Meeting: Geneva, CH, May 26-Jun. 1, 2016, 4 pp.
Karczewicz M., et al., "Improvements on adaptive loop filter," Joint Video Exploration Team (JVET) of ITU-T SG 16 WP 3 and ISO/IEC JTC 1/SC 29/WG 11, Document: JVET-B0060-v2, 2nd Meeting: San Diego, USA, Feb. 20-26, 2016, XP030150068, URL: http://phenix.int-evry.fr/jvet/., No. JVET-B0060, 6 pp.
Karczewicz M., et al., "Study of coding efficiency improvements beyond HEVC," 113. MPEG Meeting; Oct. 19, 2015-Oct. 23, 2015; Geneva, CH (Motion Picture Expert Group or ISO/IEC JTC1/SC29/WG11), No. M37102, Oct. 15, 2015 (Oct. 15, 2015), XP030065470, whole document, 13 pp.
Lan C., et al., "VCEG-AZ08-Enhancement of HEVC using Signal Dependent Transform (SDT)", 52nd Meeting, Jun. 19 through 26, 2015, Warsaw, Poland; ITU-Telecommunications Standarization Sector Study Group 16 Question 6 Video Coding Experts Group (VCEG),VCEG-AZ08_V2, Jun. 25, 2015, 7 pp.
Lin S., et al., "Affine transform prediction for next generation video coding,",Huawei Technologies, International Organisation for Standardisation Organisation Internationale De Normalisation ISO/IEC JTC1/SC29/WG11 Coding of Moving Pictures and Audio, ISO/IEC JTC1/SC29/WG11 MPEG2015/m37525, Geneva, Switzerland, Oct. 2015, 10 pp.
Liu H., et al., "Local Illumination Compensation," 52, VCEG Meeting, Jun. 19, 2015-Jun. 26, 2015, Warsaw, Poland (Video Coding Experts Group of ITU-T SG.16), No. VCEG-AZ06, Jun. 18, 2015 (Jun. 18, 2015), 11 pp. XP030003883.
Maani E, et al., "Parametric Adaptive Loop Filter," 5. JCT-VC Meeting; 96. MPEG Meeting; Mar. 16, 2011-Mar. 23, 2011; Geneva (Joint Collaborative Team on Video Coding of ISO/ IEC JTC1/SC29/WG11ANDITU-T SG.16); URL: http://wftp3.itu_int/av-arch/jctvc-site/, No. JCTVC-E320, Mar. 10, 2011 (Mar. 10, 2011), XP030008826, 5 pp.
Zhao X., et al., Qualcomm: "Mode-dependent non-separable secondary transform," ITU-T SG16 Meeting, Oct. 12, 2015-Oct. 23, 2015 Geneva, CH, No. T13-SG16-C-1 044, Sep. 30, 2015 (Sep. 30, 2015), XP030100752. 5 pp.
Rosewarne C., et al., "High Efficiency Video Coding (HEVC) Test Model16 (HM 16) Improved Encoder Description Update 4," 22nd Meeting, Geneva, CH, Oct. 15 through 21, 2015, Joint Collaborative Team on Video Coding (JCT-VC) of ITUSG16 and ISO/IEC JTC1/SC29/WG11, JCTVC-V1002, Oct. 2015, 62 pp.
Said A., et al., "Position dependent intra prediction combination," Qualcomm Incorporated, International Organisation for Standardisation Organisation Internationale De Normalisation ISO/IEC JTC1/SC29/WG11 Coding of Moving Pictures and Audio, ISO/IEC JTC1/SC29/WG11 MPEG2015/M37502, Geneva, CH, Oct. 2015, 4 pp.
Strom J., et al., "EE2-JVET related: Division-free bilateral filter," Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, JVET-F0096, pp. 1-7.
Suehring K, et al., "JEVT common test conditions and software reference configurations," 2nd Meeting, Feb. 20 through 26, 2016, San Diego, USA; Joint Collaborative Video Exploration Team (JVET) of ITU-T-SG 16 WP 3 and ISO/IEC JTC 1/SC 29/WG 11, JVET-B1010, Apr. 4, 2016, 4 pp.
Sullivan G.J., et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI:10.1109/TCSVT.2012.2221191.

(56) References Cited

OTHER PUBLICATIONS

Wiegand, T., et al., "WD3: Working Draft 3 of High-Efficiency Video Coding," Document JCTVC-E603, 5th Meeting: Geneva, CH, Mar. 16-23, 2011, 160 pages.

Wang, et al., "High Efficiency Video Coding (HEVC) Defect Report," JCT-VC Meeting; Jul. 25-Aug. 2, 2013; Vienna, AT (Joint Collaborative Team on Video Coding of ISO/IEC JTC1/SC29/WG11 and ITU-TSG.16 ); URL: http://wftp3.itu.int/av-arch/jctvc-site/, No. JCTVC-N1003_v1, Sep. 27, 2013, XP030114947, 311 pp. [uploaded in parts].

Karczewicz et al., "Geometry Transformation-based Adaptive In-Loop Filter," Picture Coding Symposium, Dec. 4-7, 2016, 5 pp.

Albrecht M., et al., "Description of SDR, HDR and 360° video coding technology proposal by Fraunhofer HHI," 10. JVET Meeting; Apr. 4, 2018-Apr. 20, 2018; San Diego, US (The Joint Video Exploration Team of ISO/IEC JTC1/SC29/WG11 and ITU-T SG.16 ), 118 pages, url: http://phenix.int-evry.fr/jvet/, No. JVET-J0014, Apr. 3, 2018 (Apr. 3, 2018), XP030151172.

De La Rocha Gomez-Arevalillo A., "Investigating the Adaptive Loop Filter in Next Generation Video Coding," Independent thesis Advanced level (degree of Master (Two Years)), Feb. 8, 2017 (Feb. 8, 2017), XP055509944, 75 pages, Retrieved from the Internet:URL: http://www.diva-portal.orgjsmashjget/diva2:1072638/FULLTEXT01.pdf [retrieved on Sep. 26, 2018].

International Search Report and Written Opinion—PCT/US2018/040775—ISA/EPO—dated Oct. 9, 2018.

Matsumura M., et al., "CE2.c.2: Reduction of Number of Filter Classes in BA Mode with having Flexible Directional Features," 11, 9. JCT-VC Meeting; 100. MPEG Meeting; Apr. 27, 2012-May 7, 2012; Geneva, ch (Joint Collaborative Team on Video Coding of ISO/IEC JTC1/SC29/WG11 and ITU-T SG.16 ); 6 pages, url: http://wftp3.itu.int/av-arch/jctvc-site/, No. JCTVC-I0054, Apr. 16, 2012 (Apr. 16, 2012), XP030111817.

Tsai C-Y., et al., "Adaptive Loop Filtering for Video Coding," IEEE Journal of Selected Topics in Signal Processing, vol. 7 (6), Dec. 1, 2013, pp. 934-945, XP055265962, US ISSN: 1932-4553, DOI: 10.1109/JSTSP .2013.2271974, the whole document.

Yamakage T., et al., "CE8.1: Block based Adaptive Loop Filter by MediaTek, Qualcomm and Toshiba," 6. JCT-VC Meeting; 97. No. m20743, MPEG Meeting; Jul. 14, 2011-Jul. 22, 2011; Torino, IT (Joint Collaborative Team on Video Coding of ISO/ IEC JTC1/SC29/WG11 and ITU-T SG.16); URL: http://wftp3.itu.int/av-arch/jctvc-site/, No. JCTVC-F321, Jul. 12, 2011 (Jul. 12, 2011), XP030009344.

Jean-Marc Valin "The Daala Directional Deringing Filter" dated Sep. 7, 2018, pp. 1-7.

\* cited by examiner

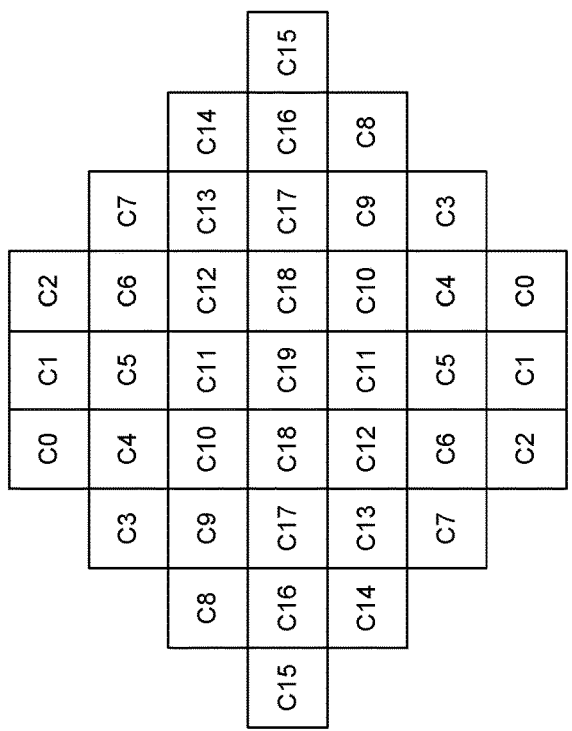
FIG. 4C
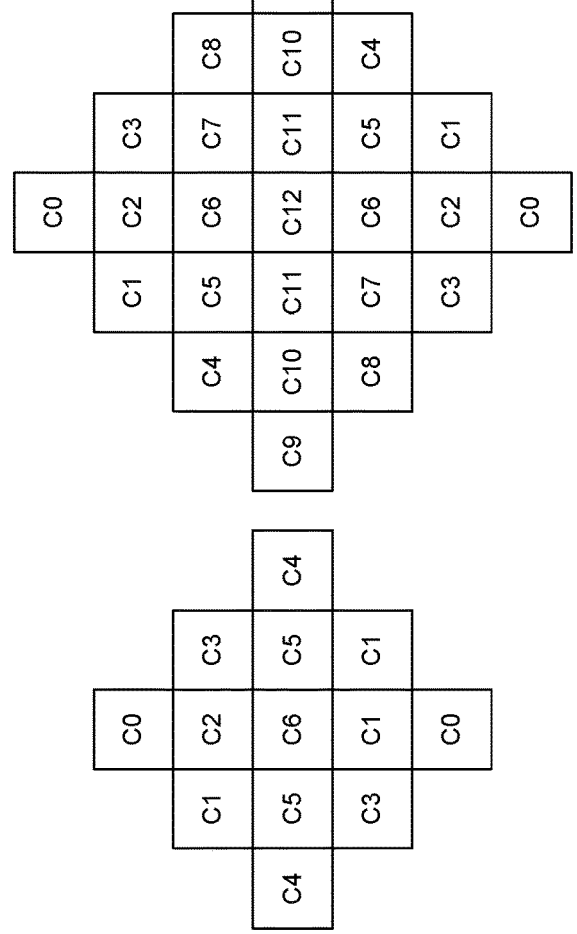
FIG. 4B
FIG. 4A

FIG. 5

ADAPTIVE LOOP FILTER WITH ENHANCED CLASSIFICATION METHODS

This application claims the benefit of U.S. Provisional Application No. 62/528,915, filed Jul. 5, 2017, the entire content of which is incorporated by reference herein.

TECHNICAL FIELD

This disclosure relates to devices for video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC) standard, and extensions of such standards. The video devices may transmit, receive, encode, decode, and/or store digital video information more efficiently by implementing such video compression techniques.

Video compression techniques may perform spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, such as coding tree blocks and coding blocks. Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized.

SUMMARY

In general, this disclosure describes techniques related to devices configured to perform adaptive loop filter (ALF), especially for improving Geometry transformation-based ALF (GALF) performance with enhanced classification methods. Techniques of this disclosure may be used in the context of advanced video codecs, such as extensions of HEVC or the next generation of video coding standards.

In one example, this disclosure describes an apparatus configured to decode video data, the apparatus comprising a memory configured to store a block of a current picture of the video data, and one or more processors in communication with the memory, the one or more processors configured to reconstruct the block of the current picture of the video data, determine a classification, from among a plurality of classifications, of the block according to a rule, wherein the rule is adaptively determined based on characteristics of coded sequences of the video data, and apply an ALF to the block based on the classification of the block.

In another example, this disclosure describes a method for decoding video data, the method comprising reconstructing a block of a current picture of the video data, determining a classification, from among a plurality of classifications, of the block according to a rule, wherein the rule is adaptively determined based on characteristics of coded sequences of the video data, and applying an ALF to the block based on the classification of the block.

In another example, this disclosure describes a non-transitory computer-readable storage medium storing instructions that, when executed, causes one or more processors of a device configured to decode video data to reconstruct the block of the current picture of the video data, determine a classification, from among a plurality of classifications, of the block according to a rule, wherein the rule is adaptively determined based on characteristics of coded sequences of the video data, and apply an ALF to the block based on the classification of the block.

In another example, this disclosure describes an apparatus configured to decode video data, the apparatus comprising means for reconstructing a block of a current picture of the video data, means for determining a classification, from among a plurality of classifications, of the block according to a rule, wherein the rule is adaptively determined based on characteristics of coded sequences of the video data, and means for applying an adaptive loop filter (ALF) to the block based on the classification of the block.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIGS. 4A-4C are conceptual diagrams illustrating example filter shapes.

FIG. 5 shows an example 5×5 diamond-shaped filter support.

DETAILED DESCRIPTION

This disclosure describes techniques for adaptively changing the classification techniques and/or number of classifications for determining what adaptive loop filter (ALF) to use on a particular block of video data. Rather than using a fixed classification technique and/or a fixed number of classifications to determine what ALF to use among a plurality of possible ALFs, this disclosure describes techniques that allow for the rules, that determine how an ALF is determined, to be adaptively changed at the block, slice, tile, picture, or sequence level. The rules for how an ALF is determined may be adaptively changed based on the characteristics of coded sequences of video data. In this way, the ALF selected for use for any particular block may be more adapted to the video data being coded and greater coding efficiency may be achieved.

In this disclosure, ordinal terms such as "first," "second," "third," and so on, are not necessarily indicators of positions within an order, but rather may simply be used to distinguish different instances of the same thing.

Figure 1:
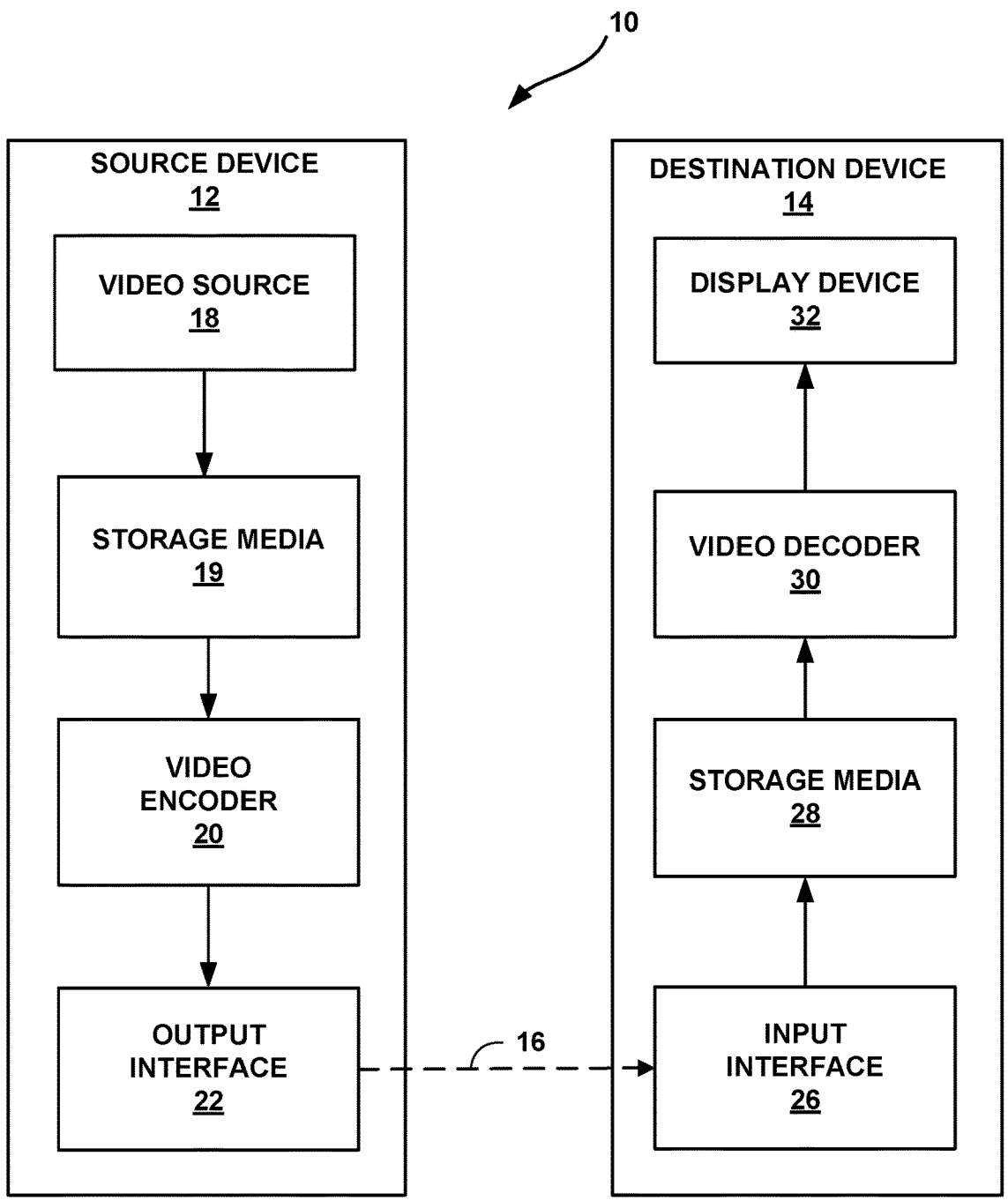
FIG. 1 is a block diagram illustrating an example video encoding and decoding system that may use one or more techniques described in this disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the encoded video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming devices, or the like. In some cases, source device 12 and destination device 14 are equipped for wireless communication. Thus, source device 12 and destination device 14 may be wireless communication devices. The techniques described in this disclosure may be applied to wireless and/or wired applications. Source device 12 is an example video encoding device (i.e., a device for encoding video data). Destination device 14 is an example video decoding device (i.e., a device for decoding video data).

The illustrated system 10 of FIG. 1 is merely one example. Techniques for processing video data may be performed by any digital video encoding and/or decoding device. In some examples, the techniques may be performed by a video encoder/decoder, typically referred to as a "CODEC." Source device 12 and destination device 14 are examples of such coding devices in which source device 12 generates coded video data for transmission to destination device 14. In some examples, source device 12 and destination device 14 operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

In the example of FIG. 1, source device 12 includes a video source 18, storage media 19 configured to store video data, a video encoder 20, and an output interface 22. Destination device 14 includes an input interface 26, storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

Video source 18 is a source of video data. The video data may comprise a series of pictures. Video source 18 may include a video capture device, such as a video camera, a video archive containing previously captured video, and/or a video feed interface to receive video data from a video content provider. In some examples, video source 18 generates computer graphics-based video data, or a combination of live video, archived video, and computer-generated video. Storage media 19 may be configured to store the video data. In each case, the captured, pre-captured, or computer-generated video may be encoded by video encoder 20.

Output interface 22 may output the encoded video information to a computer-readable medium 16. Output interface 22 may comprise various types of components or devices. For example, output interface 22 may comprise a wireless transmitter, a modem, a wired networking component (e.g., an Ethernet card), or another physical component. In examples where output interface 22 comprises a wireless transmitter, output interface 22 may be configured to transmit data, such as encoded video data, modulated according to a cellular communication standard, such as 4G, 4G-LTE, LTE Advanced, 5G, and the like. In some examples where output interface 22 comprises a wireless transmitter, output interface 22 may be configured to transmit data, such as encoded video data, modulated according to other wireless standards, such as an IEEE 802.11 specification, an IEEE 802.15 specification (e.g., ZigBee™), a Bluetooth™ standard, and the like. In some examples, circuitry of output interface 22 is integrated into circuitry of video encoder 20 and/or other components of source device 12. For example, video encoder 20 and output interface 22 may be parts of a system on a chip (SoC). The SoC may also include other components, such as a general-purpose microprocessor, a graphics processing unit, and so on.

Destination device 14 may receive encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, output interface 22 may output data, such as encoded video data, to an intermediate device, such as a storage device. Similarly, input interface 26 of destination device 12 may receive encoded data from the intermediate device. The intermediate device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In some examples, the intermediate device corresponds to a file server. Example file servers include web servers, FTP servers, network attached storage (NAS) devices, or local disk drives.

Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives data from computer-readable medium 16. Input interface 26 may comprise various types of components or devices. For example, input interface 26 may comprise a wireless receiver, a modem, a wired networking component (e.g., an Ethernet card), or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where input interface 26 comprises a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general-purpose microprocessor, a graphics processing unit, and so on.

Storage media 28 may be configured to store encoded video data, such as encoded video data (e.g., a bitstream) received by input interface 26. Display device 32 displays the decoded video data to a user. Display device 32 may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 encode and decode video data according to a video coding standard or specification. For example, video encoder 20 and video decoder 30 may encode and decode video data according to ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions, or another video coding standard or specification. In some examples, video encoder 20 and video decoder 30 encode and decode video data according to the High Efficiency Video Coding (HEVC), which as known as or ITU-T H.265, its range and screen content coding extensions, its 3D video coding extension (3D-HEVC), its multiview extension (MV-HEVC), or its scalable extension (SHVC). HEVC was developed by the Joint Collaboration Team on Video Coding (JCT-VC) of ITU-T Video Coding Experts Group (VCEG) and ISO/IEC Motion Picture Experts Group (MPEG). An HEVC draft specification, and referred to as HEVC WD hereinafter, is available from http://phenix.int-evry.fr/jct/doc_end_user/documents/14_Vienna/wg11/JCTVC-N1003-v1.zip. The HEVC standard has been finalized in January 2013.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. J. Chen, E. Alshina, G. J. Sullivan, J.-R. Ohm, J. Boyce "Algorithm description of Joint Exploration Test Model 6 (JEM6)," JVET-F1001, Hobart, June 2017, is an algorithm description for JEM6.

This disclosure may generally refer to "signaling" certain information, such as syntax elements. The term "signaling" may generally refer to the communication of syntax elements and/or other data used to decode the encoded video data. Such communication may occur in real- or near-real-time. Alternately, such communication may occur over a span of time, such as might occur when storing syntax elements to a computer-readable storage medium in an bitstream at the time of encoding, which then may be retrieved by a decoding device at any time after being stored to this medium.

In accordance with examples of this disclosure, as will be explained in more detail below, video encoder 20 and video decoder 30 may be configured to reconstruct a block of a current picture of video data, determine a classification, from among a plurality of classifications, of the block according to a rule, wherein the rule is adaptively determined based on characteristics of coded sequences of the video data, and apply an adaptive loop filter (ALF) to the block based on the classification of the block.

In HEVC and other video coding specifications, video data includes a series of pictures. Pictures may also be referred to as "frames." A picture may include one or more sample arrays. Each respective sample array of a picture may comprise an array of samples for a respective color component. A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. In some examples, to encode a block of the picture, video encoder 20 performs intra prediction or inter prediction to generate one or more predictive blocks. Additionally, video encoder 20 may generate residual data for the block. The residual block comprises residual samples. Each residual sample may indicate a difference between a sample of one of the generated predictive blocks and a corresponding sample of the block. Video encoder 20 may apply a transform to blocks of residual samples to generate transform coefficients. Furthermore, video encoder 20 may quantize the transform coefficients. In some examples, video encoder 20 may generate one or more syntax elements to represent a transform coefficient. Video encoder 20 may entropy encode one or more of the syntax elements representing the transform coefficient.

More specifically, when encoding video data according to HEVC or other video coding specifications, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may comprise one or more CTBs and may comprise syntax structures used to encode the samples of the one or more CTBs. For instance, each a CTU may comprise a CTB of luma samples, two corresponding CTBs of chroma samples, and syntax structures used to encode the samples of the CTBs. In monochrome pictures or pictures having three separate color planes, a CTU may comprise a single CTB and syntax structures used to encode the samples of the CTB. A CTU may also be referred to as a "tree block" or a "largest coding unit" (LCU). In this disclosure, a "syntax structure" may be defined as zero or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may comprise one or more coding blocks and syntax structures used to encode samples of the one or more coding blocks. For example, a CU may comprise a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may comprise a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a PU of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a PU of a current picture, video encoder 20 may generate the predictive block of the PU based on decoded samples of a reference picture (i.e., a picture other than the current picture). In HEVC, video encoder 20 generates a "prediction unit" syntax structure within a "coding_unit" syntax structure for inter predicted PUs, but does not generate a "prediction unit" syntax structure within a "coding_unit" syntax structure for intra predicted PUs. Rather, in HEVC, syntax elements related to intra predicted PUs are included directly in the "coding_unit" syntax structure.

As another example, video encoder 20 and video decoder 30 may be configured to operate according to JEM. According to JEM, a video coder (such as video encoder 00) partitions a picture into a plurality of coding tree units (CTUs). Video encoder 20 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 20 and video decoder 30 may use a single QTBT structure to represent each of the luminance and chrominance components, while in other examples, video encoder 20 and video decoder 30 may use two or more QTBT structures, such as one QTBT structure for the luminance component and another QTBT structure for both chrominance components (or two QTBT structures for respective chrominance components).

Video encoder 20 and video decoder 30 may be configured to use quadtree partitioning per HEVC, QTBT partitioning according to JEM, or other partitioning structures. For purposes of explanation, the description of some example techniques of this disclosure is presented with respect to QTBT partitioning. However, it should be understood that the techniques of this disclosure may also be applied to video coders configured to use quadtree partitioning, or other types of partitioning as well.

Figure 2A:
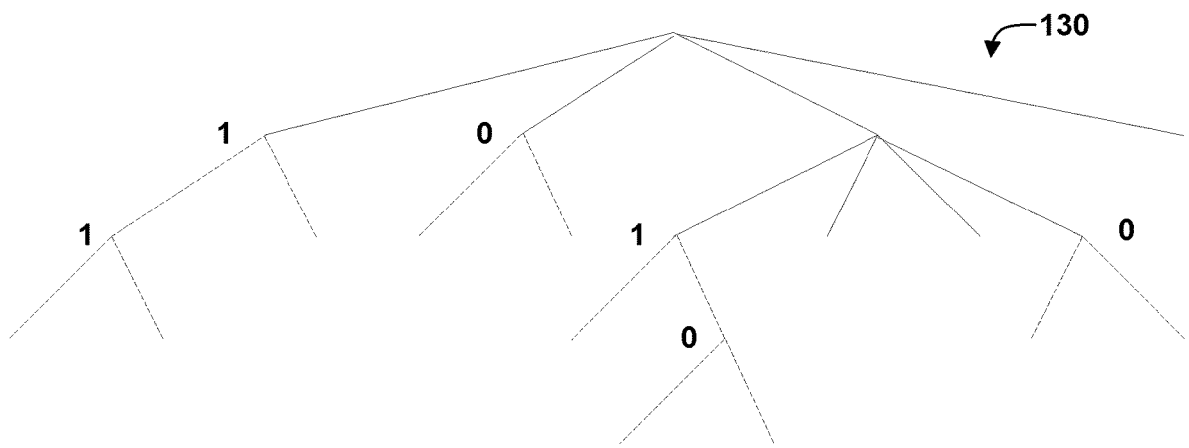
FIGS. 2A and 2B are conceptual diagrams illustrating an example quadtree binary tree (QTBT) structure, and a corresponding coding tree unit (CTU).
Figure 2B:
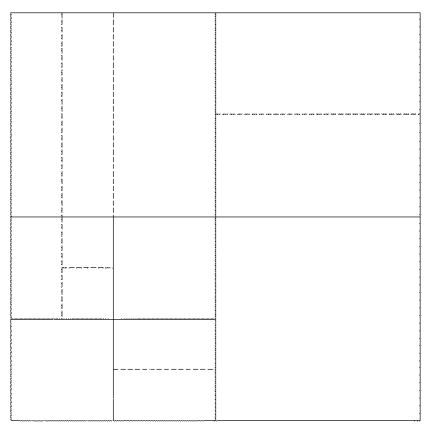

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 20 may encode, and video decoder 30 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 20 may encode, and video decoder 30 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Video encoder 20 may generate one or more residual blocks for the CU/CTU. For instance, video encoder 20 may generate a luma residual block for the CU/CTU. Each sample in the CU's/CTU's luma residual block indicates a difference between a luma sample in one of the CU's/CTU's predictive luma blocks and a corresponding sample in the CU's original luma coding block. In addition, video encoder 20 may generate a Cb residual block for the CU. Each sample in the Cb residual block of a CU/CTU may indicate a difference between a Cb sample in one of the CU's/CTU's predictive Cb blocks and a corresponding sample in the CU's original Cb coding block. Video encoder 20 may also generate a Cr residual block for the CU/CTU. Each sample in the CU's/CTU's Cr residual block may indicate a difference between a Cr sample in one of the CU's predictive Cr blocks and a corresponding sample in the CU's original Cr coding block.

Furthermore, in some examples, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

In some examples, video encoder 20 skips application of the transforms to the transform block. In such examples, video encoder 20 may treat residual sample values in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block to possibly reduce the amount of data used to represent the coefficient block, potentially providing further compression. Quantization generally refers to a process in which a range of values is compressed to a single value. For example, quantization may be done by dividing a value by a constant, and then rounding to the nearest integer. To quantize the coefficient block, video encoder 20 may quantize transform coefficients of the coefficient block. Quantization may reduce the bit depth associated with some or all the transform coefficients. For example, an n-bit transform coefficient may be rounded down to an m-bit transform coefficient during quantization, where n is greater than m. In some examples, video encoder 20 skips quantization.

Video encoder 20 may generate syntax elements indicating some or all the potentially quantized transform coefficients. Video encoder 20 may entropy encode one or more of the syntax elements indicating a quantized transform coefficient. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. The encoded representation of the video data may include an encoded representation of pictures of the video data. For example, the bitstream may comprise a sequence of bits that forms a representation of encoded pictures of the video data and associated data. In some examples, a representation of an encoded picture may include encoded representations of blocks of the picture.

Video decoder 30 may receive a bitstream generated by video encoder 20. As noted above, the bitstream may comprise an encoded representation of video data. Video decoder 30 may decode the bitstream to reconstruct pictures of the video data. As part of decoding the bitstream, video decoder 30 may obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures.

For instance, as part of decoding a picture of the video data, video decoder 30 may use inter prediction or intra prediction to generate predictive blocks. Additionally, video decoder 30 may determine transform coefficients based on syntax elements obtained from the bitstream. In some examples, video decoder 30 inverse quantizes the determined transform coefficients. Inverse quantization maps quantized value to a reconstructed value. For instance, video decoder 30 may inverse quantize a value by determining the value multiplied by a quantization step size. Furthermore, video decoder 30 may apply an inverse transform on the determined transform coefficients to determine values of residual samples. Video decoder 30 may reconstruct a block of the picture based on the residual samples and corresponding samples of the generated predictive blocks. For instance, video decoder 30 may add residual samples to corresponding samples of the generated predictive blocks to determine reconstructed samples of the block.

More specifically, in HEVC and other video coding specifications, video decoder 30 may use inter prediction or intra prediction to generate one or more predictive blocks for each PU of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct a coding block of the current CU based on samples of the predictive blocks of the PUs of the current CU and residual samples of the transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

A slice of a picture may include an integer number of blocks of the picture. For example, in HEVC and other video coding specifications, a slice of a picture may include an integer number of CTUs of the picture. The CTUs of a slice may be ordered consecutively in a scan order, such as a raster scan order. In HEVC, a slice is defined as an integer number of CTUs contained in one independent slice segment and all subsequent dependent slice segments (if any) that precede the next independent slice segment (if any) within the same access unit. Furthermore, in HEVC, a slice segment is defined as an integer number of CTUs ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. A tile is a rectangular region of CTBs within a particular tile column and a particular tile row in a picture.

In the field of video coding, it is common to apply filtering in order to enhance the quality of a reconstructed and/or decoded video signal. A filter can be applied as a post-filter, where a filtered frame is not used for prediction of future frames, or as an in-loop filter, where a filtered frame is used to predict future frames. A filter can be designed, for example, by minimizing the error between the original signal (e.g., samples of a block video data) and the decoded filtered signal (e.g., decoded and filtered samples of a block of video data). Similar to transform coefficients, the coefficients of the filter $h(k,l)$, $k=-K, \ldots, K$, $l=-K, \ldots K$ are quantized, $$f(k,l) = \text{round}(\text{normFactor} \cdot h(k,l)),$$

coded and send to the decoder. The normFactor is usually equal to $2^n$. The larger the value of normFactor the more precise is the quantization and the quantized filter coefficients $f(k,l)$ provide better performance. On the other hand, larger values of normFactor produce coefficients $f(k,l)$ requiring more bits to transmit.

In the decoder (e.g., at video decoder 30), the decoded filter coefficients $f(k,l)$ are applied to the reconstructed image $R(i,j)$ as follows $$\tilde{R}(i,j) = \sum_{k=-K}^{K} \sum_{l=-K}^{K} f(k,l) R(i+k, j+l) \bigg/ \sum_{k=-k}^{K} \sum_{l=-K}^{K} f(k,l), \quad (1)$$

where i and j are the coordinates of the pixels within the frame.

The in-loop adaptive filter was evaluated for HEVC, but not included in the final version.

An example in-loop adaptive loop filter employed in some examples of JEM was proposed in J. Chen, Y. Chen, M. Karczewicz, X. Li, H. Liu, L. Zhang, X. Zhao, "Coding tools investigation for next generation video coding," SG16-Geneva-C806, January 2015. The basic idea is similar to the ALF with block-based adaption in HM-3.0 (T. Wiegand, B. Bross, W.-J. Han, J.-R. Ohm and G. J. Sullivan, "WD3: Working Draft 3 of High-Efficiency Video Coding," Joint Collaborative Team on Video Coding (JCT-VC) of ITU-T SG16 WP3 and ISO/IEC JTC1/SC29/WG11, JCTVC-E603, 5th Meeting: Geneva, CH, 16-23 Mar. 2011, hereinafter JCTVC-E603).

The version of ALF included in HM-3.0 is based on picture level optimization. That is, the ALF coefficients are derived after a whole frame is coded. In HM-3.0, there were two modes for the luma component, referred to as block-based adaptation (BA) and region-based adaptation (RA). These two modes share the same filter shapes, filtering operations, as well as the same syntax elements. One difference between BA and RA is the classification method, where classification generally refers to classifying a pixel or block of pixels so as to determine which filter from a set of filters (e.g., a plurality of ALFs) to apply to the pixel or block of pixels.

In one example approach, the classification in BA is at a block level. For the luma component, 4×4 blocks in the whole picture are classified based on a one-dimensional (1D) Laplacian direction (e.g., up to 3 directions) and a two-dimensional (2D) Laplacian activity (e.g., up to 5 activity values). Video encoder 20 and video decoder 30 may calculate the value of direction $Dir_b$ and the value of unquantized activity $Act_b$ as shown in equations (2) through (5), below, where $\hat{I}_{i,j}$ indicates a reconstructed pixel with relative coordinate (i,j) to the top-left of a 4×4 block. $Act_b$ is further quantized to the range of 0 to 4, inclusive, as described in JCTVC-E603.

$$V_{i,j} = |\hat{I}_{i,j} \times 2 - \hat{I}_{i,j-1} - \hat{I}_{i,j+1}| \quad (2)$$

$$H_{i,j} = |\hat{I}_{i,j} \times 2 - \hat{I}_{i-1,j} - \hat{I}_{i+1,j}| \quad (3)$$

$$Dir_b = \begin{cases} 1, & \text{if } \left(\sum_{i=0}^{3}\sum_{j=0}^{3} H_{i,j} > 2 \times \sum_{i=0}^{3}\sum_{j=0}^{3} V_{i,j}\right) \\ 2, & \text{if } \left(\sum_{i=0}^{3}\sum_{j=0}^{3} V_{i,j} > 2 \times \sum_{i=0}^{3}\sum_{j=0}^{3} 2_{i,j}\right) \\ 0, & \text{otherwise} \end{cases} \quad (4)$$

$$Act_b = \sum_{i=0}^{3}\sum_{j=0}^{3}\left(\sum_{m=i-1}^{i+1}\sum_{n=j-1}^{j+1}(V_{m,n} + H_{m,n})\right) \quad (5)$$

In total, video encoder 20 and video decoder 30 may categorize each block into one out of 15 (5×3) classes and an index is assigned to each 4×4 block according to the value of $Dir_b$ and $Act_b$ of the block. Video encoder 20 and video decoder 30 may denote the group index by C, where C is set equal to $5Dir_b + \hat{A}$, wherein $\hat{A}$ is the quantized value of $Act_b$.

Figure 3:
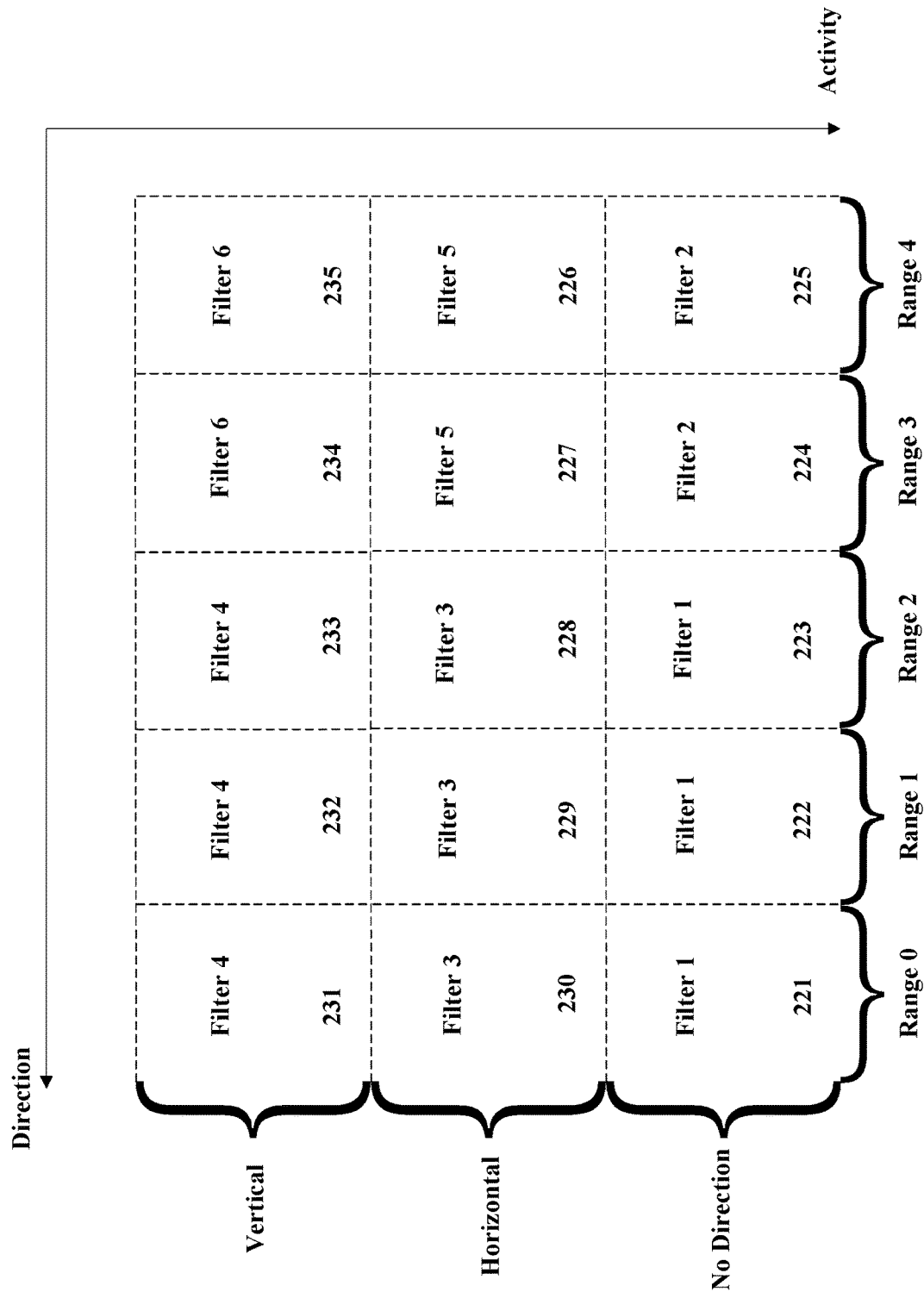
FIG. 3 is a conceptual diagram illustrating a mapping of ranges for an activity metric and a direction metric to filters.

FIG. 3 is a conceptual diagram illustrating these 15 groups (also referred to as classes) used for BA classification. In the example of FIG. 3, filters are mapped to ranges of values for an activity metric (i.e., Range 0 to Range 4) and a direction metric. The direction metric in FIG. 3 is shown as having values of No Direction, Horizontal, and Vertical, which may correspond to the values of 0, 1, and 2 above from equation 4. The particular example of FIG. 3 shows six different filters (i.e. Filter 1, Filter 2 . . . Filter 6) as being mapped to the 15 categories, but more or fewer filters may similarly be used. Although FIG. 3 shows an example, with 15 groups, identified as groups 221 through 235, more or fewer groups may also be used. For example, instead of five ranges for the activity metric, more or fewer ranges may be used resulting in more groups. Additionally, instead of only three directions, additional or alternative directions (e.g., a 45-degree direction and 135-degree direction) may also be used.

As will be explained in greater detail below, the filters associated with each group of blocks may be signaled using one or more merge flags. For one-dimensional group merging, a single flag may be sent to indicate if a group is mapped to the same filter as a previous group. For two-dimensional merging, a first flag may be sent to indicate if a group is mapped to the same filter as a first neighboring block (e.g., one of a horizontal or vertical neighbor), and if that flag is false, a second flag may be sent to indicate if the group is mapped to a second neighboring block (e.g., the other of the horizontal neighbor or the vertical neighbor).

Classes may be grouped into what are called merged groups, where each class in the merged group maps to the same filter. Referring to FIG. 3 as an example, groups 221, 222, and 223 may be grouped into a first merged group; groups 224 and 225 may be grouped into a second merged group, and so on. Typically, not all classes mapped to a certain filter need to be in the same merged group, but all classes in the merged group need to be mapped to the same filter. In other words, two merged groups may map to the same filter.

Filter coefficients may be defined or selected in order to promote desirable levels of video block filtering that can reduce blockiness and/or otherwise improve the video quality in other ways. A set of filter coefficients, for example, may define how filtering is applied along edges of video blocks or other locations within video blocks. Different filter coefficients may cause different levels of filtering with respect to different pixels of the video blocks. Filtering, for example, may smooth or sharpen differences in intensity of adjacent pixel values in order to help eliminate unwanted artifacts.

In this disclosure, the term "filter" generally refers to a set of filter coefficients. For example, a 3×3 filter may be defined by a set of 9 filter coefficients, a 5×5 filter may be defined by a set of 25 filter coefficients, a 9×5 filter may be defined by a set of 45 filter coefficients, and so on. The term "set of filters" generally refers to a group of more than one filter. For example, a set of two 3×3 filters, could include a first set of 9 filter coefficients and a second set of 9 filter coefficients. The term "shape," sometimes called the "filter support," generally refers to the number of rows of filter coefficients and number of columns of filter coefficients for a particular filter. For example, 9×9 is an example of a first shape, 7×7 is an example of a second shape, and 5×5 is an example of a third shape. In some instances, filters may take non-rectangular shapes including diamond-shapes, diamond-like shapes, circular shapes, circular-like shapes, hexagonal shapes, octagonal shapes, cross shapes, X-shapes, T-shapes, other geometric shapes, or numerous other shapes or configuration.

Quantization Process from Activities Value $Act_b$ to Activity Index $\hat{A}$

Basically, this quantization process is to define the rule of how to merge blocks with different activities to one class if the value of $Dir_b$ is the same for the blocks. The quantization process of $Act_b$ is defined as follows:

avg_var=Clip_post((NUM_ENTRY−1), ($Act_b$*ScaleFactor)>>shift);

$\hat{A}$=ActivityToIndex[avg_var]

wherein NUM_ENTRY is set to 16, ScaleFactor is set to 114, shift is equal to (3+internal coded bit-depth), Activity- ToIndex[NUM_ENTRY]={0, 1, 2, 2, 2, 3, 3, 3, 3, 3, 4, 4, 4, 4, 4, 4}}, and function Clip_post(a, b) returns the smaller value between a and b.

Therefore, up to 15 sets of ALF parameters could be signalled for the luma component of a picture. To save the signaling cost, the groups may be merged along group index value. For each merged group, video encoder 20 may signal a set of ALF coefficients to video decoder 30. Up to three circular symmetric filter shapes (as shown in FIGS. 4A, 4B, and 4C) are supported. FIGS. 4A, 4B, and 4C show ALF filter supports (left: 5×5 diamond, middle: 7×7 diamond, right: truncated 9×9 diamond). That is, FIG. 4A shows a 5×5 diamond ALF filter support; FIG. 4B shows a 7×7 diamond ALF filter support; and FIG. 4C shows a truncated 9×9 diamond ALF filter support.

In some examples, for both chroma components in a picture, video encoder 20 and video decoder 30 may apply a single set of ALF coefficients and the 5×5 diamond shape filter may be used.

In one example of ALF, at video decoder 30, each pixel sample $\hat{I}_{i,j}$ is filtered, resulting in pixel value $I'_{i,j}$ as shown in equation (6), where L denotes filter length, $f_{m,n}$ represents filter coefficient and o indicates filter offset.

$$I'_{i,j} = (\Sigma_{m=-L}^{L} \Sigma_{n=-L}^{L} f_{m,n} \times \hat{I}_{i+m,j+n} + o) >> (BD_F - 1) \quad (6)$$

wherein $(1 \ll (BD_F - 1)) = \Sigma_{m=-L}^{L} \Sigma_{n=-L}^{L} f(m,n)$ and $(o = (1 \ll (BD_F - 2))$.

In JEM2, the bit-depth, denoted by $BD_F$ is set to 9, which means the filter coefficient could be in the range of [−256, 256].

Temporal prediction of filter coefficients will now be discussed. Video encoder 20 and video decoder 30 may be configured to store the ALF coefficients of previously coded pictures and may be reused as ALF coefficients of a current picture. Video encoder 20 and video decoder 30 choose to use ALF coefficients stored for the reference pictures for use with the current picture, and bypass ALF coefficient signalling. In this case, video encoder 20 may only signal an index to one of the reference pictures, and video decoder 30 may inherit (i.e., reuse) the stored ALF coefficients of the indicated reference picture for the current picture. To indicate the usage of temporal prediction, one flag is firstly coded before sending the index.

Geometry transformations-based ALF will now be discussed. In M. Karczewicz, L. Zhang, W.-J. Chien, X. Li, "EE2.5: Improvements on adaptive loop filter," Exploration Team (JVET) of ITU-T SG 16 WP 3 and ISO/IEC JTC 1/SC 29/WG 11, Doc. JVET-B0060, 2$^{nd}$ Meeting: San Diego, USA, 20 Feb.-26 Feb. 2016 and M. Karczewicz, L. Zhang, W.-J. Chien, X. Li, "EE2.5: Improvements on adaptive loop filter", Exploration Team (JVET) of ITU-T SG 16 WP 3 and ISO/IEC JTC 1/SC 29/WG 11, Doc. JVET-O0038, 3$^{rd}$ Meeting: Geneva, CH, 26 May-1 Jun. 2016, the Geometric transformations-based ALF (GALF) is described and it has been adopted to JEM3.0. In GALF, the classification is modified with the diagonal gradients taken into consideration and geometric transformations could be applied to filter coefficients. Each 2×2 block is categorized into one out of 25 classes based on its directionality and quantized value of activity. The details are described in the following subsections.

Example classifications for GALF will now be discussed. Similar to the design of other ALFs, the classification for GALF is still based on the 1D Laplacian direction and 2D Laplacian activity of N×N luma blocks. However, for some examples of GALF, the definitions of both direction and activity have been modified to better capture local characteristics. Firstly, video encoder 20 and video decoder 30 may be configured to calculate values of two diagonal gradients, in addition to the horizontal and vertical gradients used in ALF, using a 1-D Laplacian. As it can be seen from equations (7) to (10) below, the sum of gradients of pixels within a 6×6 window that covers a target pixel is employed as the represented gradient of target pixel. According to extensive experiments, the window size, i.e., 6×6, provides a good trade-off between complexity and coding performance. Each pixel is associated with four gradient values, with vertical gradient denoted by $g_v$, horizontal gradient denoted by $g_h$, 135 degree diagonal gradient denoted by $g_{d1}$ and 45 degree diagonal gradient denoted by $g_{d2}$.

$$g_v = \sum_{k=i-2}^{i+3} \sum_{l=j-2}^{j+3} V_{k,l}, \quad (7)$$

$$V_{k,l} = |2R(k, l) - R(k, l-1) - R(k, l+1)|$$

$$g_h = \sum_{k=i-2}^{i+3} \sum_{l=j-2}^{j+3} H_{k,l}, \quad (8)$$

$$H_{k,l} = |2R(k, l) - R(k-1, l) - R(k+1, l)|$$

$$g_{d1} = \sum_{k=i-2}^{i+3} \sum_{l=j-2}^{j+3} D1_{k,l}, \quad (9)$$

$$D1_{k,l} = |2R(k, l) - R(k-1, l-1) - R(k+1, l+1)|$$

$$g_{d2} = \sum_{k=i-2}^{i+3} \sum_{j=j-2}^{j+3} D2_{k,l}, \quad (10)$$

$$D2_{k,l} = |2R(k, l) - R(k-1, l+1) - R(k+1, l-1)|$$

Here, indices i and j refer to the coordinates of the upper left pixel in the 2×2 block.

TABLE 1

Values of Direction and Its Physical Meaning

| Direction values | physical meaning |
| --- | --- |
| 0 | Texture |
| 1 | Strong horizontal/vertical |
| 2 | horizontal/vertical |
| 3 | strong diagonal |
| 4 | diagonal |

To assign the directionality D, video encoder 20 and video decoder 30 may compare the ratio of maximum and minimum of the horizontal and vertical gradients, denoted by $R_{h,v}$ in equation (10), and the ratio of maximum and minimum of two diagonal gradients, denoted by $R_{d1,d2}$ in equation (11), against each other with two thresholds $t_1$ and $t_2$.

$$R_{h,v} = g_{h,v}^{max} / g_{h,v}^{min} \quad (11)$$

wherein $g_{h,v}^{max} = \max(g_h, g_v), g_{h,v}^{min} = \min(g_h, g_v)$, $$R_{d0,d1} = g_{d0,d1}^{max} / g_{d0,d1}^{min} \quad (12)$$

wherein $g_{d0,d1}^{max} = \max(g_{d0}, g_{d1}), g_{d0,d1}^{min} = \min(g_{d0}, g_{d1})$, By comparing the detected ratios of horizontal/vertical and diagonal gradients, five direction modes, i.e., D within the range of [0, 4] inclusive, are defined in equation (12). The values of D and its physical meaning are described in Table I above.

$$D = \begin{cases} 0 & R_{h,v} \leq t_1 \&\& R_{d0,d1} \leq t_1 \\ 1 & R_{hv} > t_1 \&\& R_{h,v} > R_{d0,d1} \&\& R_{h,v} > t_2 \\ 2 & R_{hv} > t_1 \&\& R_{h,v} > R_{d0,d1} \&\& R_{h,v} \leq t_2 \\ 3 & R_{d0,d1} > t_1 \&\& R_{h,v} \leq R_{d0,d1} \&\& R_{d0,d1} > t_2 \\ 4 & R_{d0,d1} > t_1 \&\& R_{h,v} \leq R_{d0,d1} \&\& R_{d0,d1} \leq t_2 \end{cases} \quad (13)$$

The activity value A is calculated as:

$$A = \sum_{k=i-2}^{i+3} \sum_{l=j-2}^{j+3} (V_{k,l} + H_{k,l}). \quad (14)$$

A is further quantized to the range of 0 to 4 inclusive, and the quantized value is denoted as Â.

Quantization Process from Activity Value A to Activity Index Â

The quantization process is defined as follows:

avg_var=Clip_post(NUM_ENTRY−1,
 (A*ScaleFactor)>>shift);

Â=ActivityToIndex[avg_var]

wherein NUM_ENTRY is set to 16, ScaleFactor is set to 24, shift is (3+internal coded-bitdepth), ActivityToIndex[NUM_ENTRY]={0, 1, 2, 2, 2, 2, 2, 3, 3, 3, 3, 3, 3, 3, 3, 4}, function Clip_post(a, b) returns the smaller value between a and b.

Please note that due to different ways of calculating the activity value, the ScaleFactor and ActivityToIndex are both modified compared to the example ALF design in JEM2.0.

Therefore, in an example GALF scheme, each N×N block is categorized into one of 25 classes based on its directionality D and quantized value of activity Â:

$$C = 5D + \hat{A}. \quad (15)$$

Figure 5:
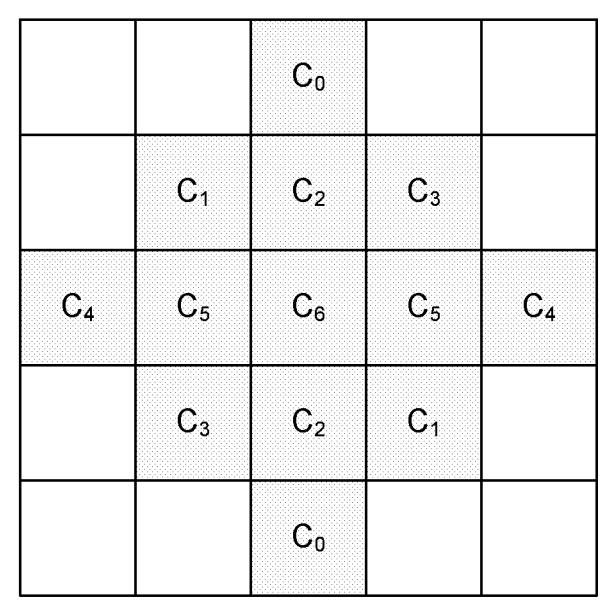
Figure 6:
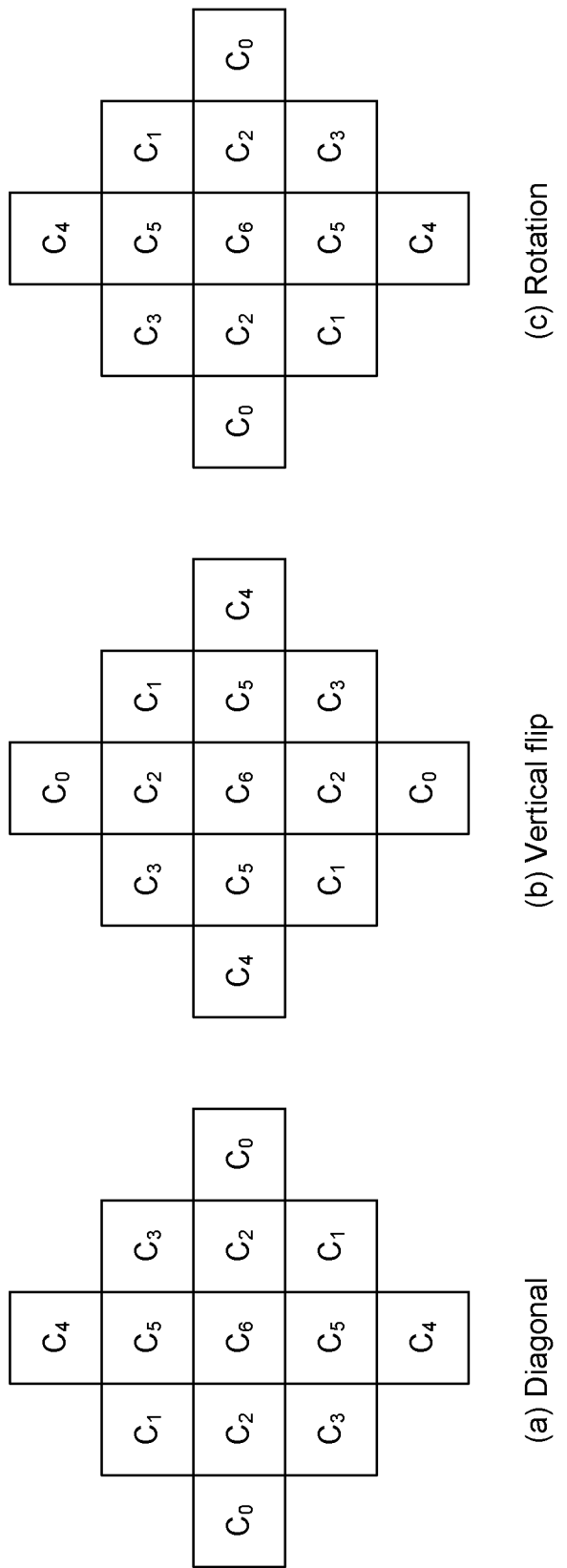
FIG. 6 shows examples of geometric transformations.

Geometry transformations will now be discussed. For each category, one set of filter coefficients may be signalled. To better distinguish different directions of blocks marked with the same category index, four geometry transformations, including no transformation, diagonal, vertical flip and rotation, are introduced. An example of 5×5 filter support with the three geometric transformations is depicted in FIG. 6. FIG. 5 shows an example 5×5 diamond-shaped filter support. FIG. 6 shows examples of geometric transformations. If we compare FIG. 5 and FIG. 6, it is easy to get the formula forms of the three additional geometry transformations:

Diagonal: $f_D(k,l) = f(l,k)$,

Vertical flip: $f_V(k,l) = f(k, K-l-1)$,

Rotation: $f_R(k = l-1, k)$. (16)

where K is the size of the filter and 0≤k, l≤K−1 are coefficients coordinates, such that location (0,0) is at the upper left corner and location (K−1, K−1) is at the lower right corner. Note that when the diamond filter support is used, such as in the existing ALF, the coefficients with coordinate out of the filter support will be always set to 0. A smart way of indicating the geometry transformation index is to derive it implicitly to avoid additional overhead. In GALF, the transformations are applied to the filter coefficients f(k,l) depending on gradient values calculated for that block. The relationship between the transformation and the four gradients calculated using equations (7)-(10) is described in Table 2. To summarize, the transformations are based on which one of two gradients (horizontal and vertical, or 45-degree and 135-degree gradients) is larger. Based on the comparison, more accurate direction information can be extracted. Therefore, different filtering results could be obtained due to transformation while the overhead of filter coefficients is not increased.

TABLE 2

MAPPING OF GRADIENT AND TRANSFORMATIONS.

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Similar to the ALF in HM, the GALF also adopts the 5×5 and 7×7 diamond filter supports. In addition, the original 9×7 filter support may be replaced by the 9×9 diamond filter support.

Prediction from fixed filters will now be discussed. To improve coding efficiency when temporal prediction is not available (intra frames), a set of 16 fixed filters may be assigned to each class. To indicate the usage of the fixed filter, a flag for each class is signaled and if required, the index of the chosen fixed filter. Even when the fixed filter is selected for a given class, the coefficients of the adaptive filter f(k,l) can still be sent for this class in which case the coefficients of the filter which will be applied to the reconstructed image are the sum of both sets of coefficients. The number of classes can share the same coefficients f(k,l) signaled in the bitstream even if different fixed filters were chosen for the classes. U.S. Patent Publication No. 2017/0238020 describes fixed filters being applied to inter-coded frames.

Signaling of filter coefficients will now be discussed, including the prediction pattern and prediction index from fixed filters. In one example, three cases are defined: case 1: no filters of the 25 classes are predicted from the fixed filter; case 2: all filters of the classes are predicted from the fixed filter; and case 3: filters associated with some classes are predicted from fixed filters and filters associated with the rest of the classes are not predicted from the fixed filters. An index may be firstly coded to indicate one of the three cases. In addition, the following applies:

If it is case 1, there is no need to further signal the index of fixed filter.

Otherwise, if it is case 2, an index of the selected fixed filter for each class is signaled Otherwise (it is case 3), one bit for each class is firstly signaled, and if a fixed filter is used, the index is further signaled.

Skipping of the DC filter coefficient will now be discussed. Because the sum of all filter coefficients is to be equal to $2^K$ (wherein K denotes the bit-depth of filter coefficient), the DC filter coefficient which is applied to the current pixel (center pixel within a filter support, such as $C_6$ in FIG. 5) may be derived without signaling.

Filter indices will now be discussed. To reduce the number of bits required to represent the filter coefficients, different classes can be merged. However, unlike the techniques described in JCTVC-E603, any set of classes can be merged, even classes having non-consecutive values of C which denotes the class index as defined in (15). The information concerning which classes are merged is provided by sending for each of the 25 classes an index $i_C$. Classes having the same index $i_C$ share the same filter coefficients that are coded. The index $i_C$ is coded with truncated binary binarization method. Other information, such as coefficients, are coded in the same way as in JEM2.0.

This disclosure describes techniques for adaptively changing the classification techniques and/or number of classifications for determining what ALF to use on a particular block of video data. Rather than using a fixed classification technique and/or a fixed number of classifications to determine what ALF to use among a plurality of possible ALFs, this disclosure describes techniques that allow for the rules that determine how an ALF is determined to be adaptively changed at the block, slice, tile, picture, or sequence level. The rules for how an ALF is determined may be adaptively changed based on the characteristics of coded sequences of video data. In this way, the ALF used for any particular block may be more adapted to the video data being coded and greater coding efficiency may be achieved.

Video encoder 20 and video decoder 30 may each be configured to perform the techniques of this disclosure. For example, video encoder 20 may be configured to adaptively determine the rules for performing block classification for ALF when performing ALF on reconstructed blocks of video data. In some examples, video encoder 20 may be configured to signal syntax elements or other indications that indicate the rules that video decoder 30 should use to perform block classification. Likewise, video decoder 30 may be configured to adaptively determine the rules for performing block classification for ALF when performing ALF on decoded blocks of video data. In some examples, video decoder 30 may be configured to determine the rules for performing block classification from syntax elements and/or indications received from video encoder 20 in an encoded video bitstream. In other examples, video decoder 30 may be configured to derive the rules for performing block classification without signaling. For example, video decoder 30 may be configured to derive the rules for performing block classification from characteristics of coded video sequences. A coded sequence may comprise a sequence of access units.

In one example, the total number of allowed classes (or classifications) may be kept unchanged while the rule(s) used by video encoder 20 and video decoder 30 to determine a class index (e.g., how to merge blocks with different activity/direction values into one class) may be adaptively changed. For example, video encoder 20 and video decoder 30 may be configured to adaptively adjust and/or change the quantization process for determining an activity index from an activity value. Video encoder 20 and video decoder 30 may be configured to make such an adjustment to the quantization process based on coded sequence characteristics.

More specifically, in one example of the disclosure, video encoder 20 may be configured to derive a function that maps an activity value to an activity index (e.g., ActivityTo Index[ ] function) based on coded sequence characteristics. In some examples, video encoder 20 may be configured to generate and signal syntax element(s) that indicate to video decoder 30 what function to use to map an activity value to an activity index. In other examples, video decoder 30 may be configured to derive the function that maps an activity value to an activity index using the same coded sequence characteristics as video encoder 20. Similar techniques can be applied to other classification characteristics, for example direction classification.

Similarly, in another example of the disclosure, video encoder 20 and video decoder 30 may be configured to adaptively determine the thresholds (e.g., $t_1$ $t_2$ in equation 13) to determine the direction value D based on coded sequence characteristics. In some examples, video encoder 20 may be configured to generate and signal syntax element(s) that indicate to video decoder 30 the thresholds for determining the direction value. In other examples, video decoder 30 may be configured to derive the thresholds for determining the direction value using the same coded sequence characteristics as video encoder 20.

In another example of the disclosure, video encoder 20 and video decoder 30 may be configured to adaptively change the total number of allowed classes (classifications) that are available. Again, video encoder 20 and video decoder 30 may be configured to determine the total number of classes based on coded sequence characteristics. Video encoder 20 and video decoder 30 may be configured to adaptively change the total number of classes on a tile/slice/picture/sequence/LCU basis. In some examples, video encoder 20 may be configured to generate and signal syntax element(s) that indicate to video decoder 30 the total number classes available for a tile, slice, picture, sequence, and/or LCU. In other examples, video decoder 30 may be configured to derive the total number of classes using the same coded sequence characteristics as video encoder 20. In examples where the total number of allowed classes is not explicitly signaled by video encoder 20, video decoder 30 may derive the total number of classes based on a rule of selecting a class index. In some examples, the signaling of rules for class index selection may be based on the transmitted total number of allowed classes.

In another example, the classification rule (i.e., the rule for determining how to classify a block for ALF selection) may be defined according to reconstructed samples. For example, video encoder 20 and video decoder 30 may record and store the occurrence/frequency of samples falling into the same range based on activity, e.g., 2D Laplacian activity. Based on the occurrence/frequency of the samples, video encoder 20 and video decoder 30 may merge different ranges (i.e., samples within the same range will result in the same quantized value).

The proposed techniques described above may be applicable to other classification characteristics, for example other matrices in addition to 1D Laplacian direction or 2D Laplacian activity.

Below is an example embodiment according to the techniques of this disclosure. In this example, for one N×M block, video encoder 20 and video decoder 30 may perform a calculation of a direction characteristic, e.g., 1D Laplacian direction (up to $\text{Num}_{Dir}$ directions after mapping) and a calculation of an activity characteristic, e.g., 2D Laplacian activity from a representative K*L block. Denote the activity value for the N×M block by Act.

Quantization Process from Activity Value Act to Activity Index Â

The quantization process may be applied and is defined as follows:

$$\text{avg\_var} = \text{Clip\_post}(\text{NUM\_ENTRY}-1, (\text{Act}*\text{ScaleFactor}) \gg \text{shift});$$

$$\hat{A} = f(\text{avg\_var})$$

In one example, NUM_ENTRY is set to 16, ScaleFactor is set to 24, and shift is (3+internal coded-bitdepth). Function Clip_post(a, b) returns the smaller value between a and b. Function $f$ is defined as follows:

$$f(avg_{var}) = \begin{cases} 0 & avg_{var} \leq Th_0 \\ 1 & avg_{var} \leq Th_1 \\ 2 & avg_{var} \leq Th_2 \\ 3 & avg_{var} \leq Th_3 \\ \ldots & \ldots \\ Num_{act} & avg_{var} \leq Th_{Num_{act}} \end{cases}$$

The thresholds used in the function $f$, e.g., $Th_i$ in the above equation, may be signaled in the bitstream by video encoder 20.

In some examples, $\hat{A}$ is derived from a look-up table, e.g., $\hat{A}$=ActivityToIndex[avg_var] with total entries equal to NUM_ENTRY. The look-up table may be signaled by video encoder 20 in a way that for each entry i, one bit may be signalled to indicate ActivityToIndex[i] is the same as ActivityToIndex[i-1]. ActivityToIndex[0] may be not signaled, and it is assumed to be 0. Similar techniques can be applied to other classification characteristics, for example direction classification.

In some examples, the occurrence of avg_var is calculated based on the reconstructed samples. If the percentage is below than a threshold, it may be automictically merged to result in the same returned value f(avg_var) as f(avg_var−1).

Figure 7:
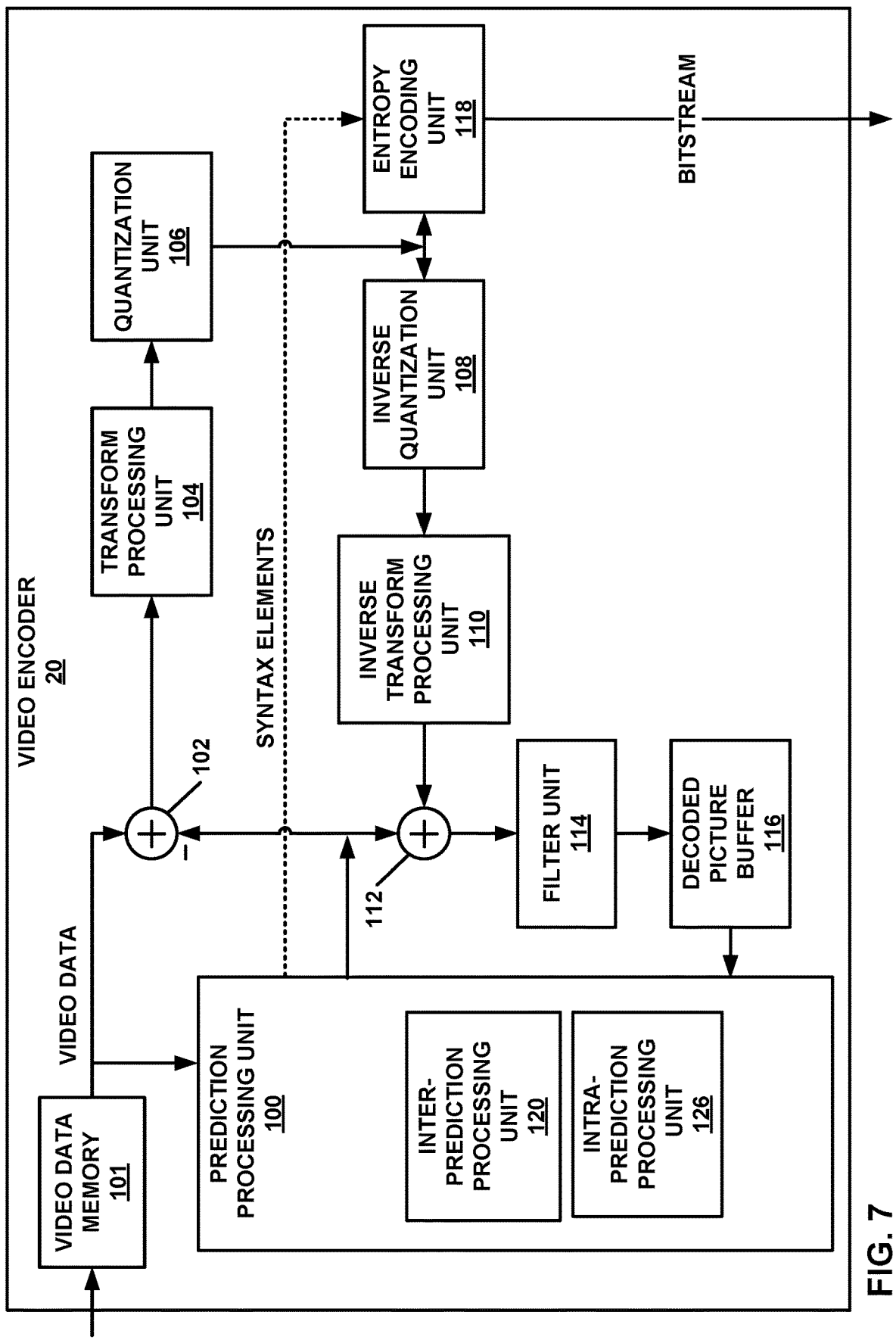
FIG. 7 is a block diagram illustrating an example video encoder that may implement one or more techniques described in this disclosure.

FIG. 7 is a block diagram illustrating an example video encoder 20 that may implement the techniques of this disclosure. FIG. 7 is provided for purposes of explanation and should not be considered limiting of the techniques as broadly exemplified and described in this disclosure. The techniques of this disclosure may be applicable to various coding standards or methods.

Processing circuitry includes video encoder 20, and video encoder 20 is configured to perform one or more of the example techniques described in this disclosure. For instance, video encoder 20 includes integrated circuitry, and the various units illustrated in FIG. 7 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 7 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

In the example of FIG. 7, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components. Video data memory 101 may be the same as or part of storage media 20 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU. As part of generating the predictive data for a PU, inter-prediction processing unit 120 performs inter prediction on the PU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform partition the residual blocks of a CU into transform blocks of TUs of the CU. For instance, transform processing unit 104 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

In some examples, filter unit 114 may perform ALF and/or GALF. For instance, filter unit 114 may perform ALF/GALF with the enhanced classification methods described in this disclosure.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents values of transform coefficients for a CU.

Figure 8:
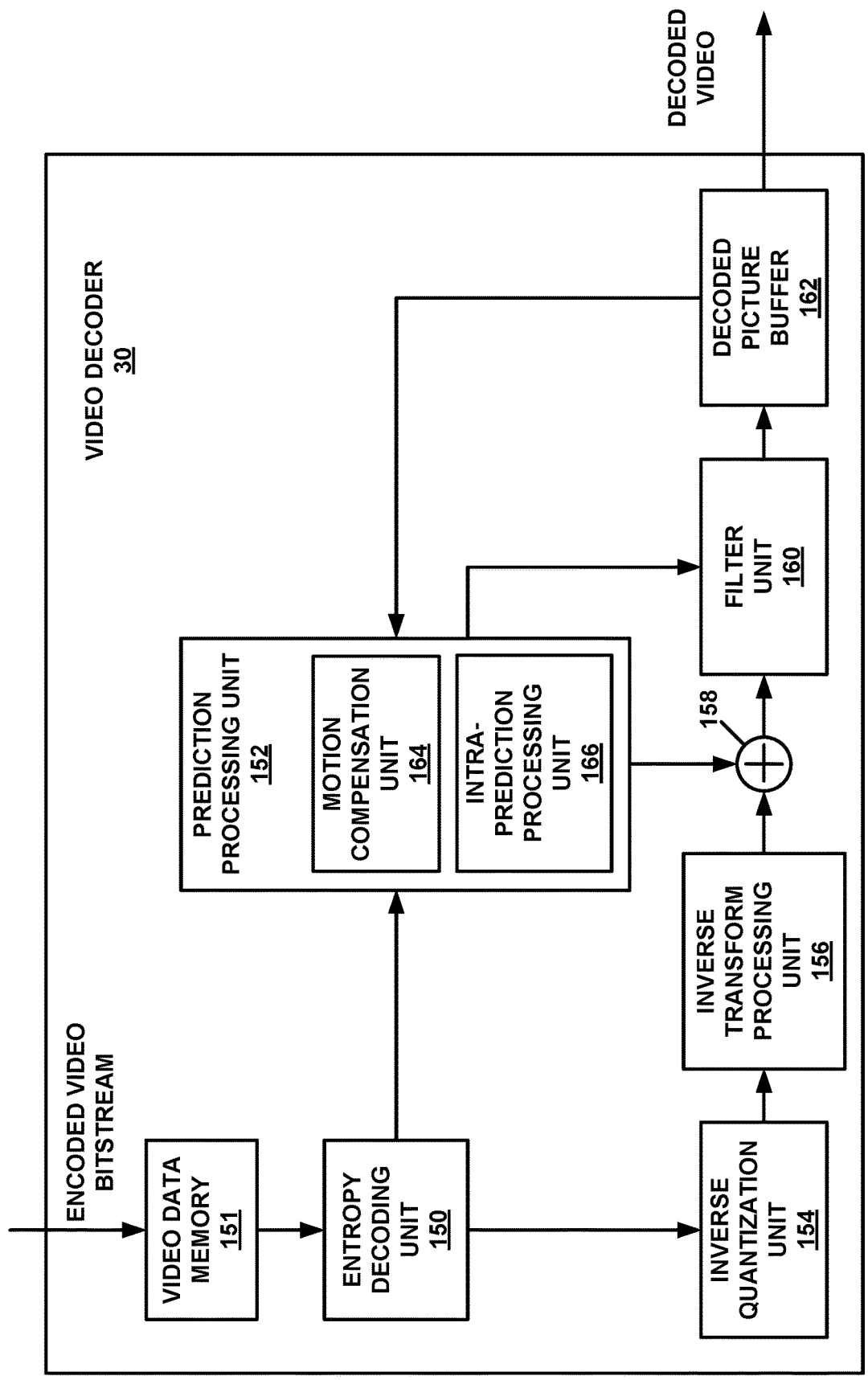
FIG. 8 is a block diagram illustrating an example video decoder that may implement one or more techniques described in this disclosure.

FIG. 8 is a block diagram illustrating an example video decoder 30 that is configured to implement the techniques of this disclosure. FIG. 8 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Processing circuitry includes video decoder 30, and video decoder 30 is configured to perform one or more of the example techniques described in this disclosure. For instance, video decoder 30 includes integrated circuitry, and the various units illustrated in FIG. 8 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 8 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 8, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

Inverse quantization unit 154 may perform particular techniques of this disclosure. For example, for at least one respective quantization group of a plurality of quantization groups within a CTB of a CTU of a picture of the video data, inverse quantization unit 154 may derive, based at least in part on local quantization information signaled in the bitstream, a respective quantization parameter for the respective quantization group. Additionally, in this example, inverse quantization unit 154 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 156, reconstruction unit 158, and filter unit 160) may reconstruct, based on inverse quantized transform coefficients of the transform block, a coding block of the CU.

If a block is encoded using intra prediction, intra-prediction processing unit 166 may perform intra prediction to generate predictive blocks of the block. Intra-prediction processing unit 166 may use an intra prediction mode to generate the predictive blocks of the PU based on samples spatially-neighboring blocks. Intra-prediction processing unit 166 may determine the intra prediction mode for the block based on one or more syntax elements obtained from the bitstream.

If a block is encoded using inter prediction, entropy decoding unit 150 may determine motion information for the block. Motion compensation unit 164 may determine, based on the motion information of the block, one or more reference blocks. Motion compensation unit 164 may generate, based on the one or more reference blocks, predictive blocks (e.g., predictive luma, Cb and Cr blocks) for the block.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

In some examples, filter unit 160 may perform ALF and/or GALF. For instance, filter unit 160 may perform ALF/GALF with the enhanced classification methods described in this disclosure.

Figure 9:
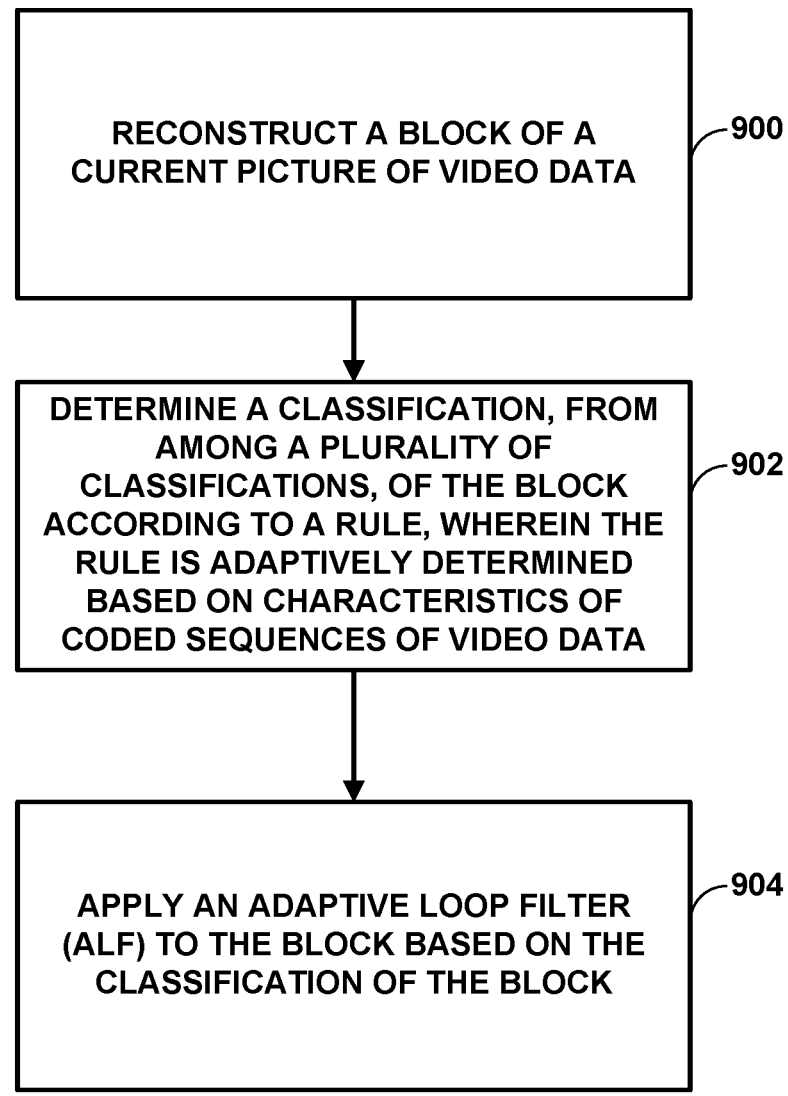
FIG. 9 is a flowchart illustrating an example encoding and decoding method of this disclosure.

FIG. 9 is a flowchart illustrating an example encoding and decoding method of this disclosure. The techniques of FIG. 9 may be performed by both video encoder 20 and video decoder 30. That is, video encoder 20 may be configured to perform the adaptive loop filter techniques of this disclosure when reconstructing blocks of video data before storing the reconstructed blocks in a decoded picture buffer. Likewise, video decoder 30 may be configured to perform the adaptive loop filter techniques of this disclosure when decoding/reconstructing blocks of video data before storing the reconstructed blocks in a decoded picture buffer.

In one example, of the disclosure, video encoder 20 and/or video decoder 30 may be configured to reconstruct a block of the current picture of the video data (900), determine a classification, from among a plurality of classifications, of the block according to a rule, wherein the rule is adaptively determined based on characteristics of coded sequences of the video data (902), and apply an adaptive loop filter (ALF) to the block based on the classification of the block (904). Video encoder 20 and video decoder 30 may be configured to output the block after applying the ALF. Video encoder 20 may be configured to output the block to a decoded picture buffer for use in encoding future blocks (e.g., inter-prediction). Video decoder 30 may be configured to output the block to a decoded picture buffer for use in decoding future blocks (e.g., inter-prediction). Video decoder 30 may also output the block for display.

In one example of the disclosure, to determine the classification, video encoder 20 and/or video decoder 30 may be configured to adjust a quantization process for determining an activity value of the block of the current picture based on the rule. In another example of the disclosure, to adjust the quantization process, video encoder 20 and/or video decoder 30 may be configured to determine a function of mapping the activity value of the block of the current picture to an activity index based on the rule, and determine the classification based on the activity index.

In another example of the disclosure, to determine the classification, video encoder 20 and/or video decoder 30 may be configured to determine one or more thresholds for determining a direction value of the block of the current picture based on the rule, determine the direction value of the block of the current picture based on the one or more thresholds, and determine the classification based on the direction value.

In another example of the disclosure, video encoder 20 may be configured to generate and signal, in a bitstream that comprises an encoded representation of the current picture, an indication of the rule. Video decoder 30 may be configured to obtain, from the bitstream that comprises an encoded representation of the current picture, the indication of the rule.

In another example of the disclosure, video encoder 20 and/or video decoder 30 may be configured to derive the rule based on characteristics of coded sequences of the video data. In one example, the rule indicates how to merge blocks with different activity values into one class. In another example, the rule indicates how to merge blocks with different direction values into one class. Video encoder 20 may be configured to generate and signal, in a bitstream that comprises an encoded representation of the current picture, an indication of the rule. Video decoder 30 may be configured to obtain, from the bitstream that comprises an encoded representation of the current picture, the indication of the rule.

In another example of the disclosure, video encoder 20 and/or video decoder 30 may be configured to determine the classification, from among the plurality of classifications, of the block according to the rule, wherein the rule indicates how to merge blocks with different activity values and direction values into one class.

In another example of the disclosure, video encoder 20 and/or video decoder 30 may be configured to adaptively change a total number of allowed classifications of the plurality of classifications, per unit, wherein the unit is one of a tile, slice, picture, sequence, or largest coding unit (LCU).

Certain aspects of this disclosure have been described with respect to extensions of the HEVC standard for purposes of illustration. However, the techniques described in this disclosure may be useful for other video coding processes, including other standard or proprietary video coding processes not yet developed, including H.266.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to decode video data, the apparatus comprising:
   a memory configured to store a block of a current picture of the video data; and
   one or more processors in communication with the memory, the one or more processors configured to:
   reconstruct the block of the current picture of the video data;
   determine a classification, from among a plurality of classifications, of the block according to a rule, wherein the rule is adaptively determined based on characteristics of coded sequences of the video data, and wherein the rule is based on a bit-depth of a pixel in the block; and
   apply an adaptive loop filter (ALF) to the block based on the classification of the block.

2. The apparatus of claim 1, wherein, to determine the classification, the one or more processors may be further configured to:
   adjust a quantization process for determining an activity value of the block of the current picture based on the rule.

3. The apparatus of claim 2, wherein, to adjust the quantization process, the one or more processors may be configured to:
   determine a function of mapping the activity value of the block of the current picture to an activity index based on the rule; and
   determine the classification based on the activity index.

4. The apparatus of claim 1, wherein, to determine the classification, the one or more processors may be further configured to:
   determine one or more thresholds for determining a direction value of the block of the current picture based on the rule;
   determine the direction value of the block of the current picture based on the one or more thresholds; and
   determine the classification based on the direction value.

5. The apparatus of claim 1, wherein the ALF is a geometric transformation-based ALF (GALF).

6. The apparatus of claim 1, wherein the one or more processors are further configured to:
   obtain, from a bitstream that comprises an encoded representation of the current picture, an indication of the rule.

7. The apparatus of claim 1, wherein the one or more processors are further configured to:
   derive the rule based on characteristics of coded sequences of the video data.

8. The apparatus of claim 1, wherein the rule indicates how to merge blocks with different activity values into one class.

9. The apparatus of claim 8, wherein the one or more processors are further configured to obtain, from a bitstream that comprises an encoded representation of the current picture, an indication of the rule that indicates how to merge blocks with different activity values into one class.

10. The apparatus of claim 1, wherein the rule indicates how to merge blocks with different direction values into one class.

11. The apparatus of claim 10, wherein the one or more processors are further configured to obtain, from a bitstream that comprises an encoded representation of the current picture, an indication of the rule that indicates how to merge blocks with different direction values into one class.

12. The apparatus of claim 1, wherein to determine the classification, the one or more processors are further configured to:
   determine the classification, from among the plurality of classifications, of the block according to the rule, wherein the rule indicates how to merge blocks with different activity values and direction values into one class.

13. The apparatus of claim 1, wherein the one or more processors are further configured to adaptively change a total number of allowed classifications of the plurality of classifications, per unit, wherein the unit is one of a tile, slice, picture, sequence, or largest coding unit (LCU).

14. The apparatus of claim 1, wherein the one or more processors are further configured to:
   output the block after applying the ALF.

15. A method for decoding video data, the method comprising:
   reconstructing a block of a current picture of the video data;
   determining a classification, from among a plurality of classifications, of the block according to a rule, wherein the rule is adaptively determined based on characteristics of coded sequences of the video data, and wherein the rule is based on a bit-depth of a pixel in the block; and
   applying an adaptive loop filter (ALF) to the block based on the classification of the block.

16. The method of claim 15, wherein determining the classification comprises:
   adjusting a quantization process for determining an activity value of the block of the current picture based on the rule.

17. The method of claim 16, wherein adjusting the quantization process comprises:
   determining a function of mapping the activity value of the block of the current picture to an activity index based on the rule; and
   determining the classification based on the activity index.

18. The method of claim 15, wherein determining the classification comprises:
   determining one or more thresholds for determining a direction value of the block of the current picture based on the rule;
   determining the direction value of the block of the current picture based on the one or more thresholds; and
   determining the classification based on the direction value.

19. The method of claim 15, wherein the ALF is a geometric transformation-based ALF (GALF).

20. The method of claim 15, further comprising:
   obtaining, from a bitstream that comprises an encoded representation of the current picture, an indication of the rule.

21. The method of claim 15, further comprising:
   deriving the rule based on characteristics of coded sequences of the video data.

22. The method of claim 15, wherein the rule indicates how to merge blocks with different activity values into one class.

23. The method of claim 22, further comprising:
   obtaining, from a bitstream that comprises an encoded representation of the current picture, an indication of the rule that indicates how to merge blocks with different activity values into one class.

24. The method of claim 15, wherein the rule indicates how to merge blocks with different direction values into one class.

25. The method of claim 24, further comprising:
   obtaining, from a bitstream that comprises an encoded representation of the current picture, an indication of the rule that indicates how to merge blocks with different direction values into one class.

26. The method of claim 15, further comprising:
   determining the classification, from among the plurality of classifications, of the block according to the rule, wherein the rule indicates how to merge blocks with different activity values and direction values into one class.

27. The method of claim 15, further comprising:
   adaptively changing a total number of allowed classifications of the plurality of classifications, per unit, wherein the unit is one of a tile, slice, picture, sequence, or largest coding unit (LCU).

28. The method of claim 15, further comprising:
   outputting the block after applying the ALF.

29. A non-transitory computer-readable storage medium storing instructions that, when executed, causes one or more processors of a device configured to decode video data to:
   reconstruct the block of the current picture of the video data;
   determine a classification, from among a plurality of classifications, of the block according to a rule, wherein the rule is adaptively determined based on characteristics of coded sequences of the video data, and wherein the rule is based on a bit-depth of a pixel in the block; and
   apply an adaptive loop filter (ALF) to the block based on the classification of the block.

30. An apparatus configured to decode video data, the apparatus comprising:
   means for reconstructing a block of a current picture of the video data;
   means for determining a classification, from among a plurality of classifications, of the block according to a rule, wherein the rule is adaptively determined based on characteristics of coded sequences of the video data, and wherein the rule is based on a bit-depth of a pixel in the block; and
   means for applying an adaptive loop filter (ALF) to the block based on the classification of the block.

* * * * *